ELECTRONIC LINE FINDER SYSTEM

Filed Nov. 14, 1945 7 Sheets-Sheet 1

INVENTORS
EDMOND M. DELORAINE
DAVID H. RANSOM

BY

R P Morris
ATTORNEY

Aug. 29, 1950 E. M. DELORAINE ET AL 2,520,132

ELECTRONIC LINE FINDER SYSTEM

Filed Nov. 14, 1945 7 Sheets-Sheet 2

INVENTORS
EDMOND M. DELORAINE
DAVID H. RANSOM

BY

R H Morris

ATTORNEY

ELECTRONIC LINE FINDER SYSTEM

INVENTORS
EDMOND M. DELORAINE
DAVID H. RANSOM

BY

ATTORNEY

Aug. 29, 1950 E. M. DELORAINE ET AL 2,520,132

ELECTRONIC LINE FINDER SYSTEM

Filed Nov. 14, 1945 7 Sheets-Sheet 4

INVENTORS
EDMOND M. DELORAINE
DAVID H. RANSOM

BY

R. P. Morris

ATTORNEY

INVENTORS
EDMOND M. DELORAINE
DAVID H. RANSOM
BY
R K Morris
ATTORNEY

INVENTORS
EDMOND M. DELORAINE
DAVID H. RANSOM
BY
R. P. Morris
ATTORNEY

ELECTRONIC LINE FINDER SYSTEM

Filed Nov. 14, 1945 7 Sheets-Sheet 7

INVENTORS
EDMOND M. DELORAINE
DAVID H. RANSOM
BY
R P Morris
ATTORNEY

Patented Aug. 29, 1950 2,520,132

UNITED STATES PATENT OFFICE 2,520,132

ELECTRONIC LINE FINDER SYSTEM

Edmond M. Deloraine, Paris, France, and David H. Ransom, Montclair, N. J., assignors to Federal Telephone and Radio Corporation, New York, N. Y., a corporation of Delaware Application November 14, 1945, Serial No. 628,614

20 Claims. (Cl. 179—18)

This invention relates to communication systems and more particularly to line finder systems for use in telephony.

In telephone systems generally in use, interconnection between subscribers' lines through the various trunking lines in telephone exchange requires considerable mechanical switching and a large plant set up. Furthermore, large numbers of interconnecting lines are generally required in the exchange so that connection may be made between any two lines incoming into the system. Likewise, considerable complication is presented in the signalling system for line selections and ringing.

Some replacement of mechanical switching systems by electronic switches has been proposed but, in general, all of these systems require still the mechanical selection of lines for interconnection. The electronic switches as proposed generally are used simply to replace some of the mechanical switches in the system. Furthermore, ringing and other signalling is carried through conventional switching circuits in the same manner as in the telephone systems generally in use.

In a copending application of E. M. Deloraine, entitled "Communication System," Serial No. 628,613, filed Nov. 14, 1945, a simplified exchange system is disclosed. This system provides an exchange system in which each of a plurality of channels is connected to a common distributor unit which serves successively to scan the lines so that each has a predetermined time position in the scanning cycle and to produce in response to signals of any one channel a time displacement equal substantially to the time displacement between the channels to be interconnected so that the signals may be properly redistributed to this output channel. To accomplish this it further provides an exchange system in which each of a plurality of lines for transferring communication signals is allotted a predetermined position in a distributor scanning cycle so that signals from all the lines in operation are reproduced in parallel, for example in time displaced relation, on a common interconnecting medium and in which these communication signals are delayed a proper amount so that upon reapplication to the distributor system they will be applied to a selected other one of the lines of the system.

It is an object of our invention to provide a line finder system for a telephone exchange as outlined above which will serve to select a particular channel to the exclusion of other channels therein.

It is a further object of our invention to provide a channel selector for a particular channel of a plurality of pulse channels to the exclusion of other channels therein.

It is a still further object of our invention to block other line finder circuits from coupling to a particular line finder once it has found a predetermined line or channel.

It is a still further object of our invention to provide means for effectively maintaining the sensitivity of a line finder to a selected line or channel while reducing its sensitivity for selection by other lines or channels.

It is a still further object of our invention to provide a control means in response to a called party's line selection to block seizure of the called party's line by a line finder in response to his answering a call.

It is a still further object of our invention to provide in a pulse type telephone exchange a system for timing a link selecting circuit to select a predetermined calling signal channel and/or to block others of said link circuits from selecting said calling channel and/or blocking of said links from selecting the called channel once a communication circuit has been established.

In a telephone system of the type contemplated, the signal or speech currents in the various lines or other channels may be replaced at the exchange by a series of narrow pulses of amplitude corresponding to the amplitude of the original current at the corresponding time. The pulses are produced at sufficient rapidity so that they define substantially the signal envelope. In this manner by allotting different time positions to each line, the signal or voice currents within the exchange may be distributed over a common channel each signal being repeated by a series of pulses displaced in time in accordance with the distributor time position. This distribution may be readily accomplished by means of a cathode ray tube serving as a distributor which will sequentially scan the lines connected to predetermined terminals and respond if there is a signalling voltage on the line. The channels may be separated by time selection and may be applied through time displacement means and a low-pass filter which serves to reproduce the audio envelope to the same or another distributor also coupled to the lines. The incoming signals may serve to adjust the time displacement means so that they will represent the time difference between the time position of the calling line and the selected called line. The time displacement means may be an actual delay line of some form or an equivalent circuit which, while not producing an actual delay of the signals, will effectively serve to store the energy and release it after a predetermined interval equal to the desired delay. In this manner, the interconnection of any one line with any other line of the system may be accomplished. Upon making this interconnection, the communication signals may pass through the same delay means between the interconnected lines. Furthermore, since the scanning cycle covers each of the lines connected to the distributor, as many simultaneous connections may be made as there are time displacement trunking channels within the exchange.

In accordance with our invention, means are provided responsive to the interconnection of the lines to tie up these lines so that they cannot be selected by another subscriber attempting to get the connection. Moreover, the system provides means to maintain the sensitivity with respect to the calling line, while effectively preventing connections of other lines.

While we have broadly outlined certain objects and features of our invention, a better understanding thereof and the objects and features thereof may be had from the particular description of a telephone exchange embodying the invention therein made with reference to the accompanying drawings, in which.

Figure 4:
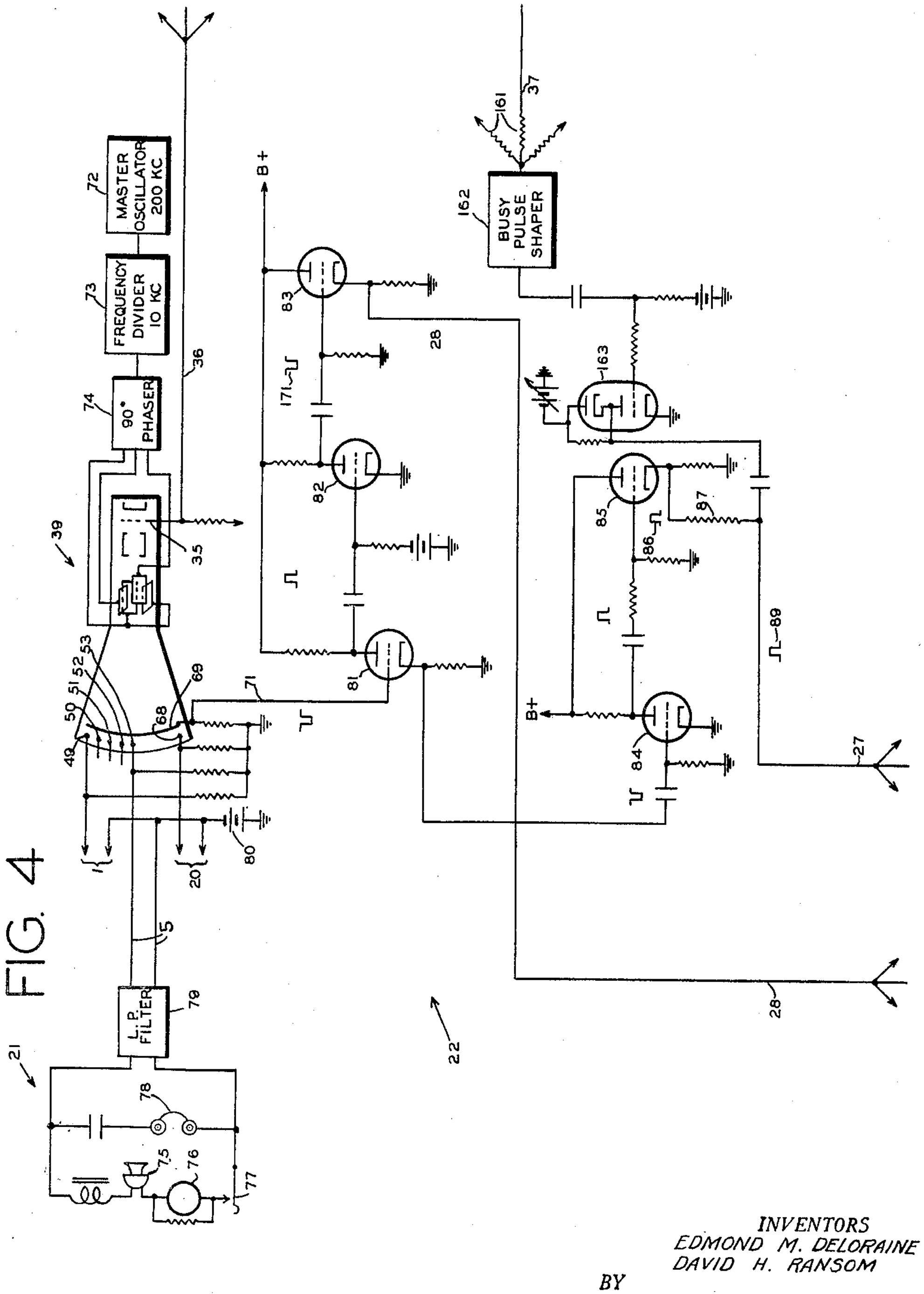
Figure 5:
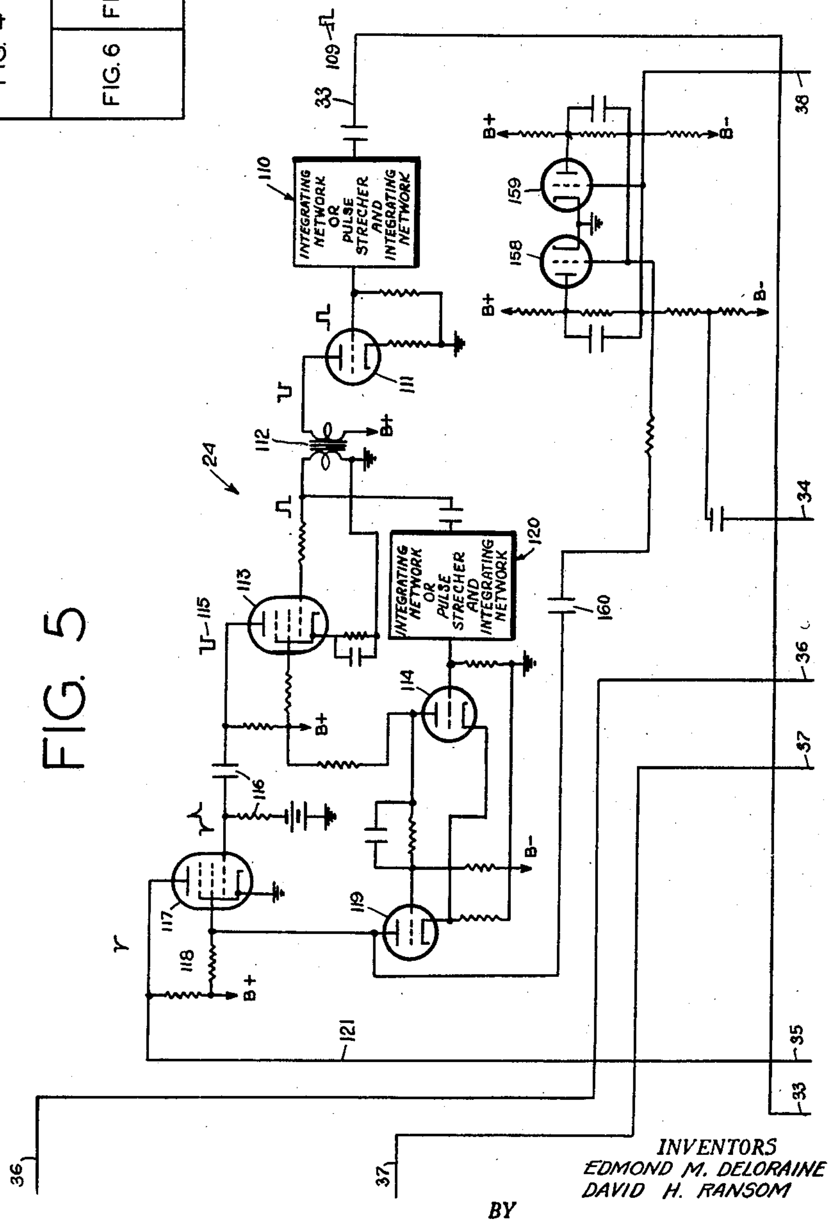
Figure 6:
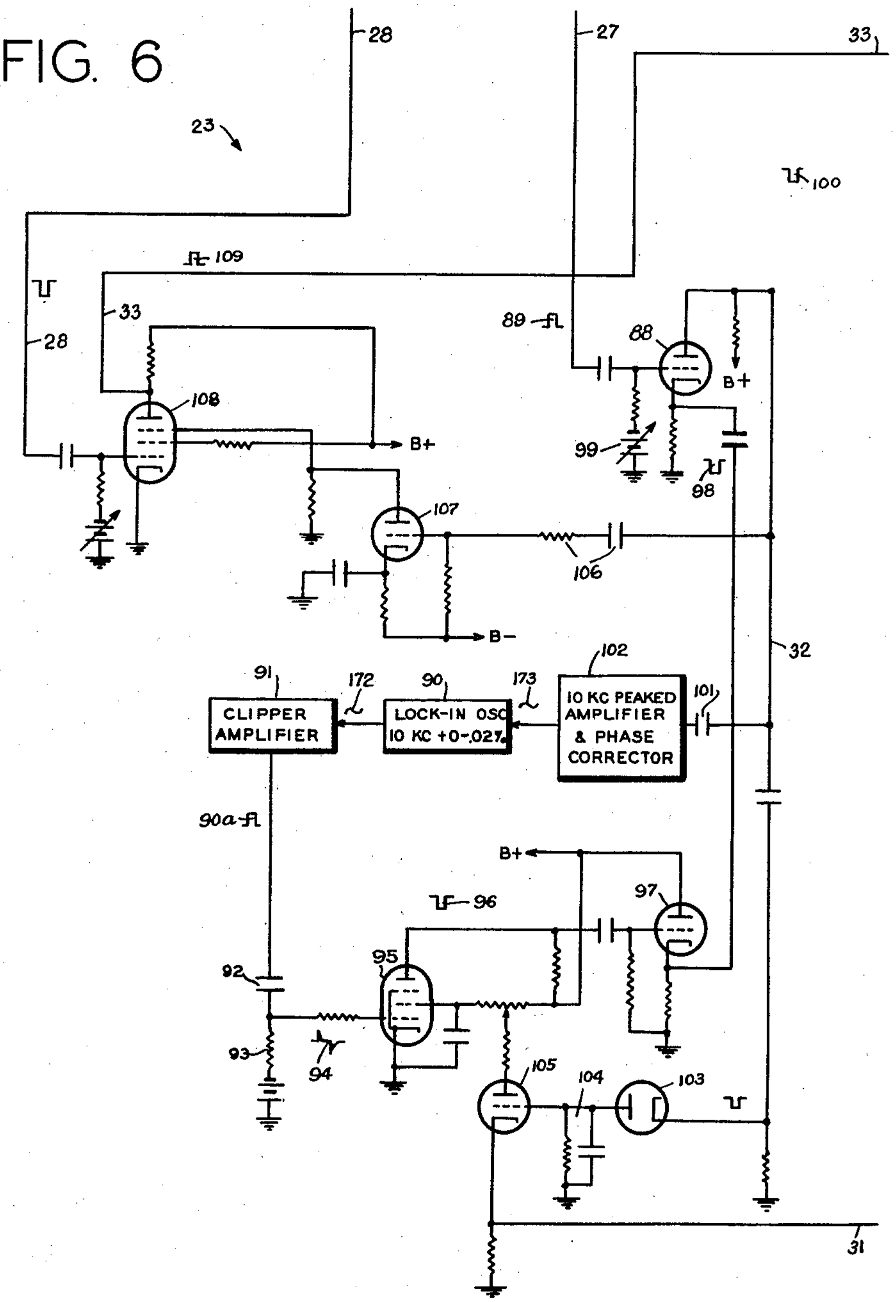
Figure 7:
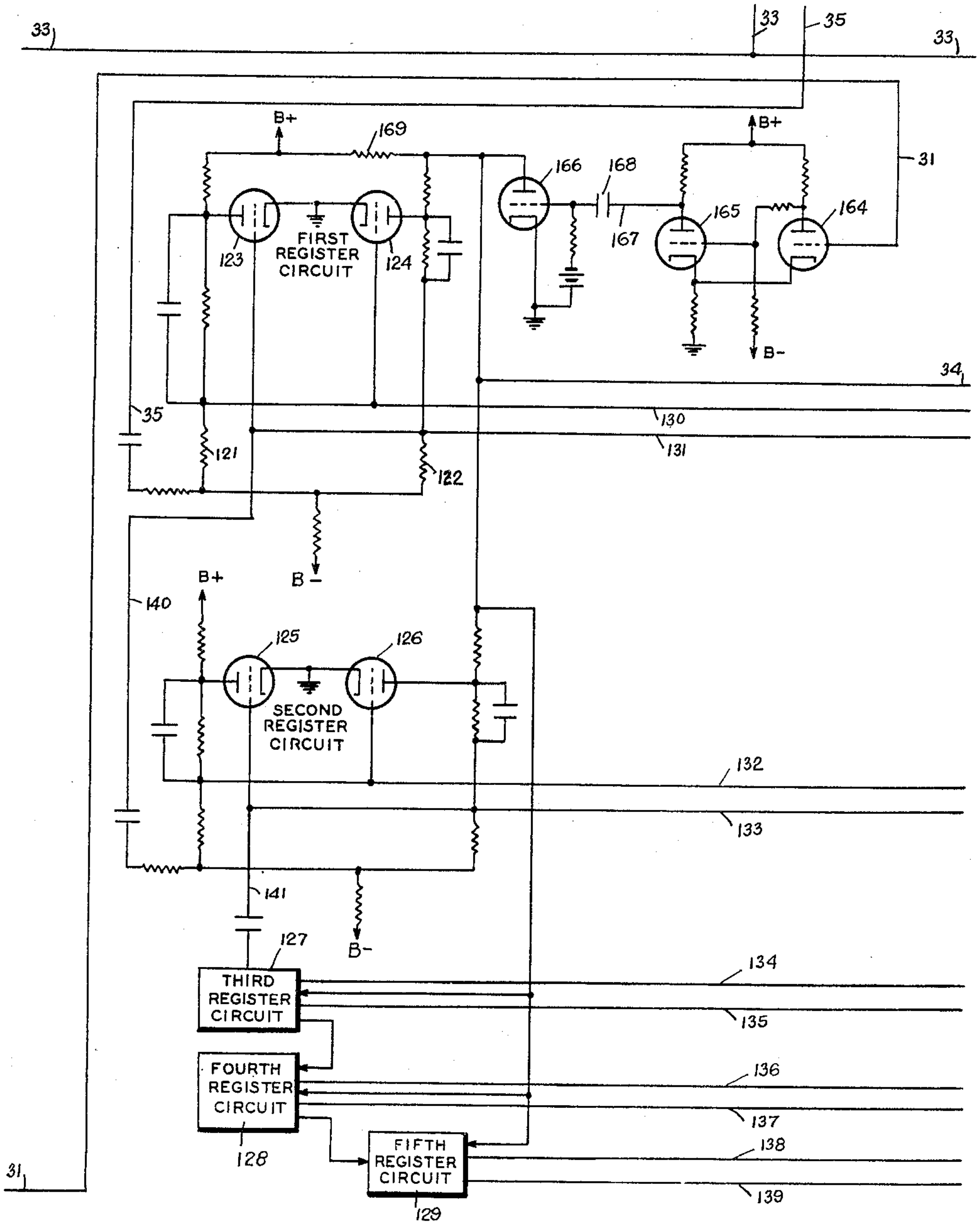

Figs. 4 to 8 inclusive, constitute a circuit diagram of a link exchange in accordance with our invention;

Fig. 4 illustrating the common equipment,

Fig. 5 showing the pulse forming equipment,

Fig. 6 the line finder equipment,

Fig. 7 the dial register equipment, and

Figure 9:
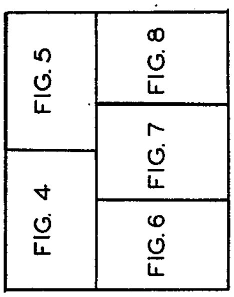
Figure 8:
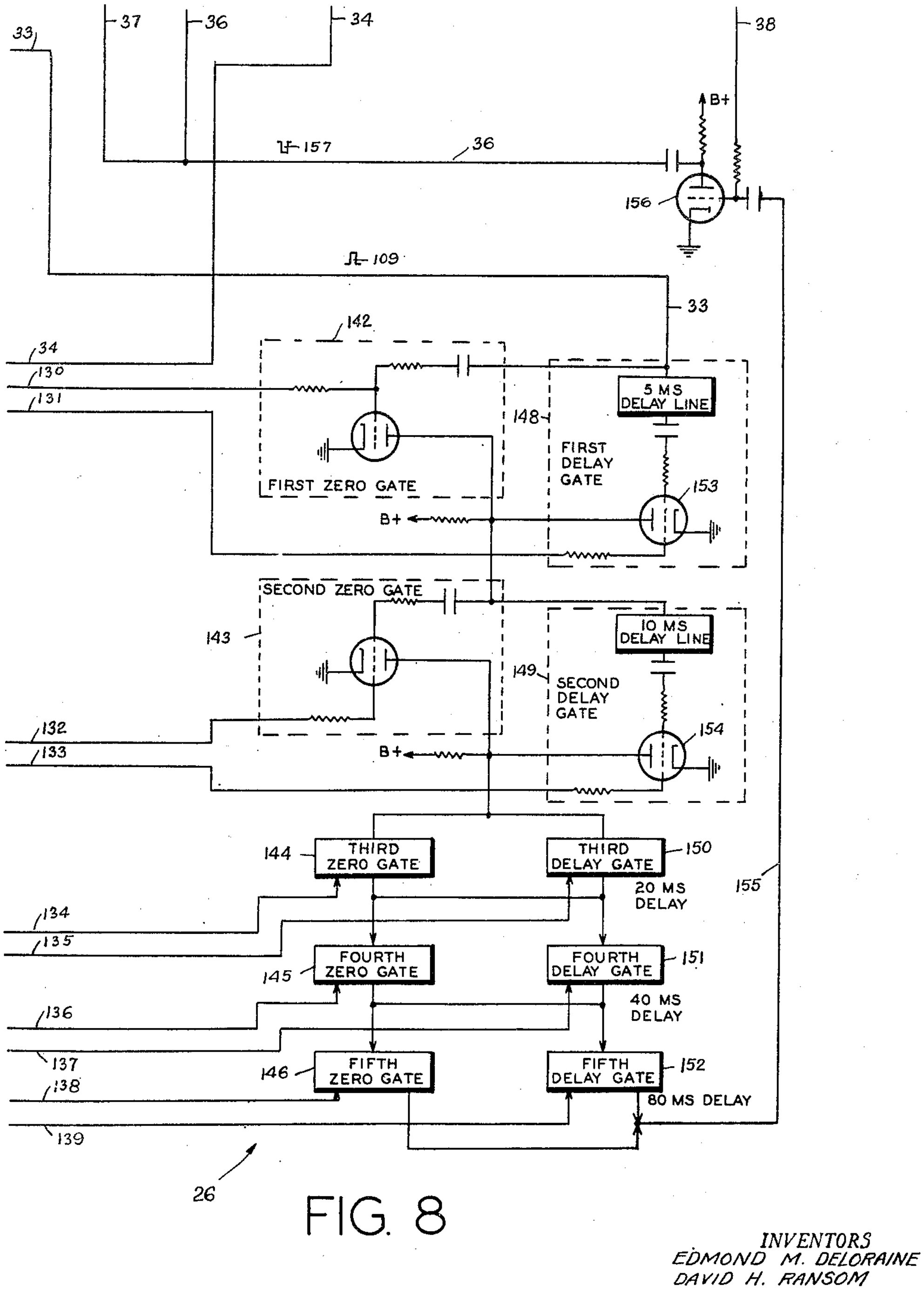
Figures 10, 11:
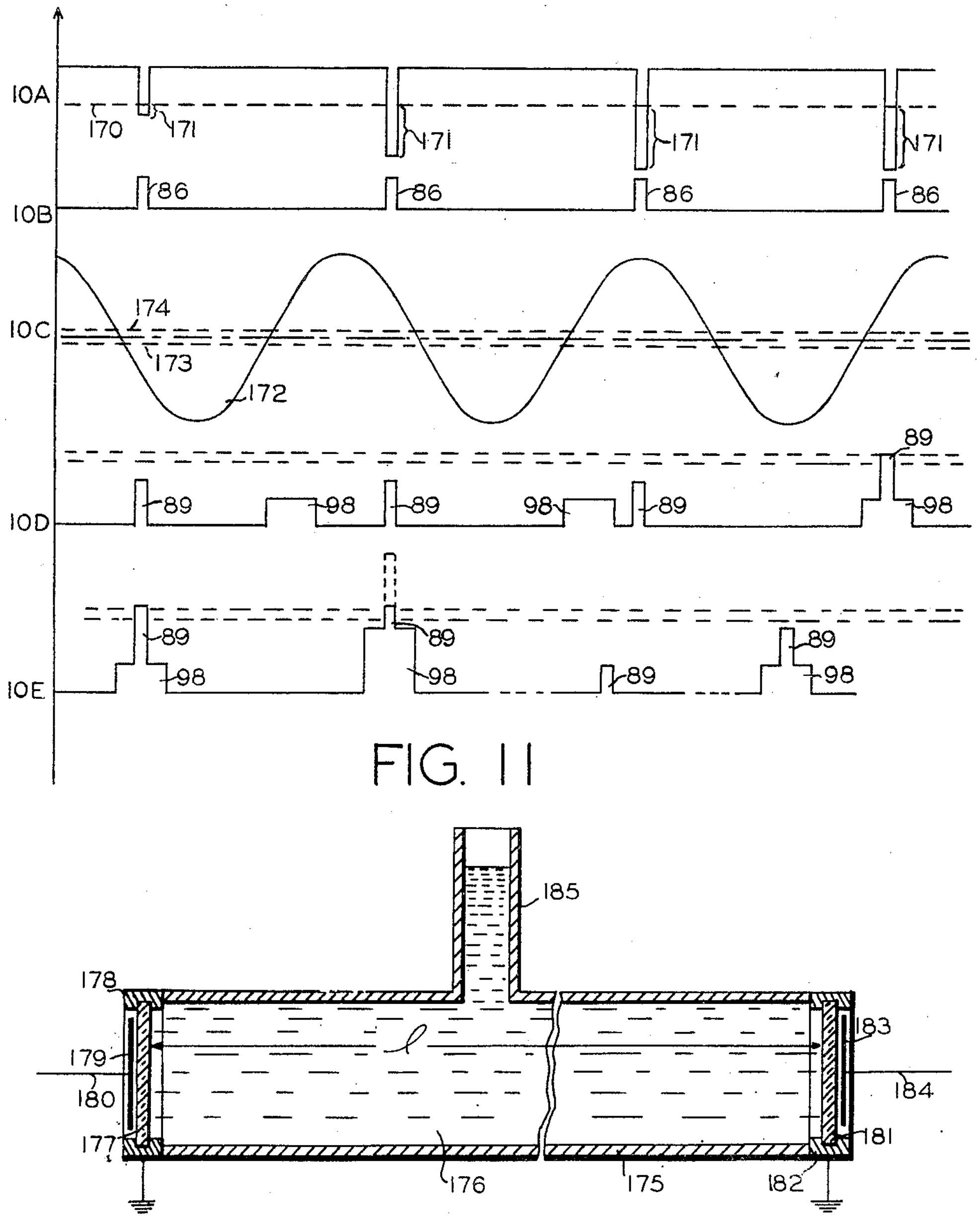

Fig. 8 the line selecting equipment;

Fig. 9 is a diagram illustrating how Figs. 4 to 8 inclusive, should be arranged to illustrate the complete circuit;

Fig. 10 is a set of curves used in explaining the operation of certain parts of the system; and Fig. 11 is a diagram in section of a delay line suitable for use in the equipment shown in Fig. 8.

Figure 1:
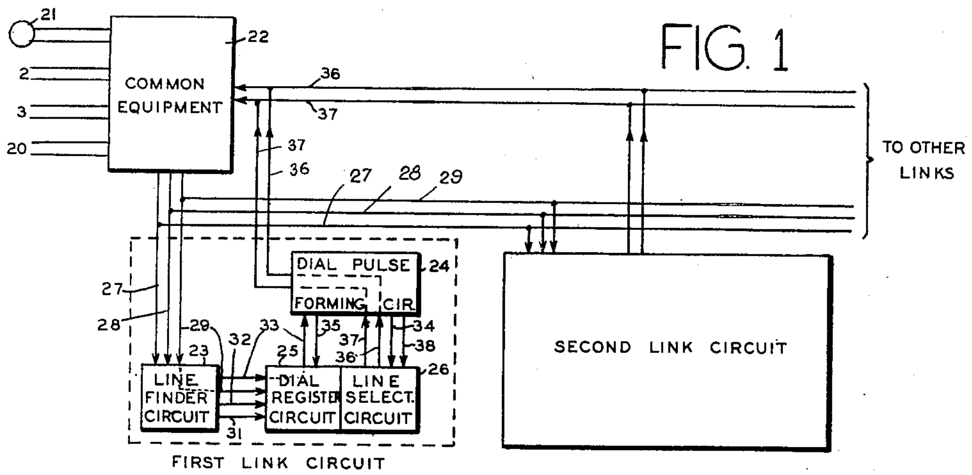
Fig. 1 is a block diagram illustrating the general circuit set up.

In an example of a telephone exchange system as outlined above, the system may be divided into three parts as shown in Fig. 1: first, all the subscribers' lines, twenty for example, assigned numerals 1 to 20, each of these lines having a subscriber sub-set equipment such as 21; second, the equipment common to all line circuits, hereafter referred to as common equipment 22; and third, a group of link circuits one of which is needed for each simultaneous call. Each of the link circuits may be further subdivided into line finder circuit 23, dial pulse forming circuit 24, dial register circuit 25 and line selecting circuit 26. These several major components are interconnected by wires 27–38 inclusive, as shown in Fig. 1. For the sake of simplicity in the description only one-way conversation is illustrated.

As shown, all lines 1 to 20 terminate in common equipment 22. This equipment 22 performs a scanning function, preferably by means of a suitable tube having an electronic beam which sweeps each of the lines in turn.

When one of these lines has a potential indicative of a calling condition, the common equipment 22 applies signals over wires 27 and 28 to all the link circuits in parallel and specifically to the line finder circuit 23 of the first link (chosen for discussion). This line finder 23 operates to find the calling line and transfer the signals over wire 33 to the dial pulse forming circuit 24.

When dialing ensues, this circuit 24 produces dial pulses which are counted and stored in dial register circuit 25. The dial pulse register 25 then serves to control the line selector circuit 26 which may comprise a delay line or other time displacement apparatus.

The incoming speech signals are then transferred from common equipment 22 over wire 28, line finder circuit 23, wire 33, line selector circuit 26 and thence over wire 36 back to the common equipment 22, from whence they are applied to the selected outgoing line. The part of Fig. 1 comprising line finder 23, dial pulse forming circuit 24, dial register 25 and line selector circuit 26 may be considered together as a link circuit. For certain embodiments of the system, a synchronizing frequency may be fed from common equipment 22 over lead 29 to line selector circuit 26 and line finder circuit 23 respectively. The five leads 27, 28, 29, 37 and 38 from common equipment 22 may also be multiplied to other link circuits of the system as shown.

Figures 2, 3:
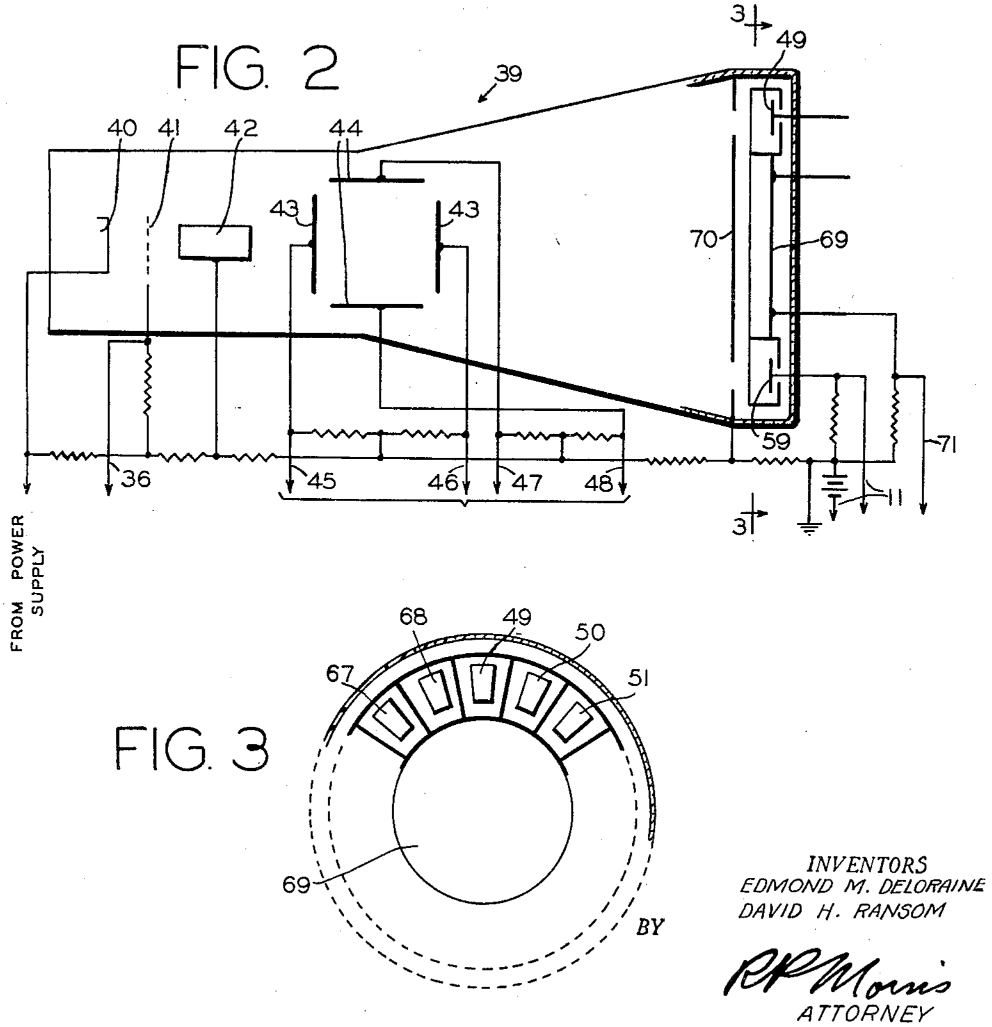
Figs. 2 and 3 are sectional circuit diagrams and views respectively, of a distributor tube used in our system.

The distributor function of common equipment 22 may be performed by a rotating distributor in the form of a cathode ray tube as illustrated in detail in Figs. 2 and 3. The distributor tube is indicated generally at 39 and may comprise a cathode 40, the usual grid 41, focus and anode electrode 42, horizontal deflector plates 43 and vertical deflector plates 44. Two-phase distributor currents from a suitable sweep control may be applied over leads 45, 46, 47 and 48 to the horizontal and vertical deflector plates respectively, so as to produce a cyclic rotation of the electron beam. At the target end of tube 39 are provided twenty coupling targets 49 to 68, respectively, which are coupled with the individual lines 1 to 20 inclusive. These targets may comprise secondary electron emissive elements associated with a common anode 69 to provide dynodes all having a common output. A mask or screen 70 may be provided, if desired, having apertures therein so that the electron beam will impinge on each dynode only when the beam is aligned therewith thus preventing possible secondary emission from others. The output of the distributor tube 39 is connected from anode 69 over lead 71, then signal isolating circuits hereafter described to leads 27 and 28 which go to the line finder circuit as shown in Fig. 1. The output from the line selecting circuit 26 may be applied as indicated over line 36 to the grid 41 serving to modulate the beam in accordance with the selected signal energy. Thus, referring to Fig. 1, the output from lead 71 may be applied after suitable delay (produced in line selecting equipment 26 as hereafter described) over lead 36 to grid 41 to provide the desired communication channel between the chosen pair of lines.

The common equipment 22 is illustrated in Fig. 4. For illustrative purposes a base frequency of 10,000 cycles per second has been selected as the scanning rate of the rotating distributor. This frequency is sufficiently high to reproduce voice frequencies with adequate fidelity for transmission of speech. For the twenty-line system the base frequency is derived from a 200 kilocycle stable oscillator 72 preferably crystal controlled. This higher frequency is preferably utilized since it is generally easier to build a more stable oscillator at the higher frequencies than at the lower 10,000 cycle frequency which is to be used. Furthermore, in certain of the modifications illustrated, the 200 kilocycle wave may be utilized for other control purposes. The sinusoidal frequency generated in master oscillator 72 is reduced to the base frequency of ten kilocycles in frequency divider 73.

The output of frequency divider 73 is applied over 90° phase shifter 74 to the vertical and horizontal sets of deflecting plates 43 and 44 of distributor tube 39 herein diagrammatically illustrated. This will serve to rotate the beam at a frequency of 10,000 revolutions per second so that each of the dynodes 49 to 68, illustrated in Figs. 2 and 3 and in this figure, will be scanned once every 10,000ths of a second. Incoming lines 1, 5 and 20 are shown connected to the respective dynodes 49, 53 and 68.

At 21 is illustrated a typical subscriber sub-set (shown connected to line 5) for use in the system according to our invention. Such a sub-set will be connected to each of the incoming lines 1 to 20 inclusive. The voice transmitter 75 is connected in series with dial 76 and the normally open switch hook 77. The receiver 78 is bridged permanently across the line, since, for simplicity of illustration, no separate ringing equipment has been illustrated. Accordingly, the signal for summoning a called subscriber may be applied as a special tone which will be reproduced in receiver 78 to call the listener to the phone.

As in the usual equipment, switch hook 77 is normally open. However, upon initiating a call, the switch becomes closed, completing a circuit in the calling line loop over low-pass filter 79 and the associated lines at the sub-set, applying a negative potential from battery 80 to the associated dynode 49. Normally the dynode electrodes 49 to 68 are at the same potential as anode 69 so no current flows. This negative potential will produce a difference in potential and cause secondary emission current to flow from the dynodes upon impingement of the beam of tube 39 thereon, producing a negative output pulse in output line 71. The pulses are preferably signal modulated to a depth of only 25 to 50 per cent so that there will always be sufficient amplitude to furnish energy to establish and maintain connections regardless of modulating signals. The negative pulses resulting from operation of the selected dynode 49 are fed to the grid of inverter tube 81. The anode circuit of tube 81 is coupled to the grid of clipper tube 82 which serves to clip these pulses at a predetermined level to pass only the modulated portions of the incoming pulses. Thus, the output of this tube, representing the speech signals, may be substantially 100 per cent modulated. These clipped pulses are then applied to a cathode follower tube 83 and from there to all of the link circuits over the cathode follower output lead 28. A second output is taken across the cathode resistance of inverter tube 81, these pulses being applied to a clipper tube 84 which serves to clip the pulses to a constant level eliminating modulation effects therefrom. The anode circuit of tube 84 is coupled to the grid of a cathode follower tube 85 which serves to apply pulses 86 through common feed resistor 87 over wire 27 to the grid of line finder gate tube 88 (shown in Fig. 6) of line finder 23 (shown in Figs. 6 and 1) in the first link circuit (now under consideration) and in parallel to the grids of the corresponding line finder gate tubes in all other links. The pulse 86 after passing through resistor 87 may be called 89, so that the pulse actually arriving at the grid of tube 88 and of the other similar tubes is pulse 89. Under the conditions now assumed, when none of the grids of the line finder gate tubes is drawing grid current, pulse 89 is nearly as strong as pulse 86; but under other conditions it may be much weaker than 86 as hereafter explained. In the absence of any signals on the cathode of this line finder gate tube 88, the above traced pulse 89 on its grid is insufficient to cause the flow of plate current, because the bias applied to the grid is sufficiently far below cutoff.

In the line finder 23 (Figs. 1 and 6) is provided an oscillator 90 normally operating at a frequency slightly lower than the output frequency from frequency divider 73 in Fig. 4. This oscillator may, for example, operate at one-fiftieth of one per cent below the frequency of the frequency divider. The output energy from oscillator 90 is applied to a clipper amplifier 91 which serves to produce rectangular selecting pulses. These pulses are differentiated in a differentiating network consisting of condenser 92 and resistor 93, to produce the pulse formation 94 which is applied to the control grid of clipper tube 95. The output pulses 96 from tube 95 (corresponding to the leading edge of pulse 90 and the position part of formation 94) are applied to cathode follower tube 97. The resulting pulses 98 are applied to the cathode of tube 88 normally tending to make the cathode of this tube more negative so that the tube will be more nearly conductive. However, except when the pulses 98 applied to the cathode of tube 88 coincide with the previously traced incoming pulses 89, applied via wire 27 to the grid thereof, tube 88 is ineffective. Sufficient bias is applied to the grid of tube 88 from battery 99 so that it requires the combined amplitudes of the two pulses 89 and 98 to operate this tube. As oscillator 90 continues to drift relative to the output of frequency divider 73, the pulses 98 will commence to coincide with the pulses 89 incoming from the calling line, overcoming the bias in tube 88 and producing output pulses 100 in line 32. These output pulses 100 then are applied over condenser 101 to a peaked amplifier and phase corrector circuit 102 which serves to lock oscillator 90 into step with the incoming pulses 89 so that its output is in synchronism with the frequency from divider 73, and pulses 98 will then continue to coincide regularly with the incoming pulses 89 from the predetermined calling line. As soon as the oscillator is locked into step, the pulses from line 32 also are applied over rectifier 103 and an integrating network 104 to a control grid of delayed gain control tube 105. Operation of tube 105 increases the positive voltage on the screen of clipper tube 95 increasing the amplitude of the output pulses 96 and hence 98. The value of resistor 87 and the grid current characteristics of tube 88 are such that the total positive swing of its grid with respect to its cathode cannot exceed a predetermined small amplitude regardless of the magnitudes of pulses 98 and 86 which are applied respectively to the cathode and via resistor 87 to the grid of tube 88. However, the square pulses 98 from tube 97 will increase in amplitude with the change in bias of tube 95. Thus, since the sum of pulses 89 and 98 is roughly constant, while the value of the component 98 is rising, it is clear that the magnitude of pulses 89 must be correspondingly decreasing. This decrease in amplitude of pulse 89 is effective to prevent other line finder gate tubes (similar to 88 but in other links) from responding as more fully explained hereafter in conjunction with Fig. 10.

This decrease in pulse 89 does not, however, reduce the response of tube 88 in the first link (now under consideration) since the total input between grid and cathode is not decreased. Thus, pulses 100 are roughly constant in amplitude. These pulses 100 from the line finder gate tube 88 are applied also over line 32 and coupling circuit 106 to gate control tube 107 which serves to control the suppressor bias on the input gate tube 108. Tube 108 is normally conditioned by suppressor grid bias so that the pulses applied thereto from the output of cathode follower 83 over line 28 will not be passed by the tube. However, upon operation of tube 107, by selection of a predetermined incoming line as described above, the suppressor grid of tube 108 has applied to it such a potential that the tube becomes conductive during the instants corresponding to the time-channel of such predetermined line. Accordingly then, combined dial-and-speech pulses 109 will be applied from the output of tube 108 over line 33 to the pulse forming equipment 24 of Figs. 1 and 5 and to the line selecting equipment 26 of Figs. 1 and 8. However, the energy applied to the line selecting equipment of Fig. 8 will not be passed until such time as line selection has been effected which will be described later.

Line finder 23 having now operated, pulses 109 from line 33 corresponding to the time channel individual to the predetermined line assumed to be calling are applied to an integrating network 110 which may or may not be preceded by a pulse stretching circuit similar to a peak voltmeter. These pulses are then amplified in tube 111 and are applied over transformer 112 to the control grid of the clipper tube 113 and to the control grid of a second tube 114. The integrating network 110 in the input circuit of tube 111 functions as a low-pass filter which will pass the dial pulses but will not pass the higher frequency communication signals. The clipper 113 serves to shape and clip the incoming dial pulses to form square wave pulses 115 which in turn are differentiated in network 116 and applied to the control grid of dial gate tube 117. Tube 117 is biased so as to suppress the negative part of the differentiated pulse (corresponding to the leading edge of the square dial pulse 115) and to pass only the positive part of the differentiated pulse, corresponding to the trailing edge of such square wave pulse 115. Normally tube 117 is nearly cut-off by the voltage drop in its screen grid resistor 118 which is common with the plate of a normally conducting tube 119 of a flip-flop circuit which operates in conjunction with tube 114. This cut-off bias serves to prevent low amplitude signals which may precede the dialing pulses from passing and falsely operating the pulse register. Time constants of this filter are so adjusted that the leading edge of the first dial pulse serves to cause tube 114 to operate, cutting off tube 119. Low-pass filter and time constant circuit 120 in the grid circuit of tube 119 causes this condition to be maintained for the interval of the pulse signal series until shortly after the last pulse has passed, when the flip-flop circuit will return to normal, again rendering the dial gate tube 117 insensitive. By provision of this special blocking circuit, transient effects before and after dialing will not affect the register. The output pulses from dial gate tube 117 are applied over line 35 to the dial pulse register circuits 25 of Fig. 1, this pulse passing through resistors 121 and 122 to grids of the first register stage.

The dial pulse register circuits consists of a series of tubes of which 123, 124, 125 and 126 are shown in detail connected as conventional trigger circuits for operation as a binary counter. Blocks 127, 128 and 129 constitute further register trigger circuits not shown in detail, there being a sufficient number of these register circuits to count any dialing number in the exchange. With the system shown for twenty lines the five shown are sufficient. Initially, the tubes on the right hand side such as 124 and 126 are conducting serving to bias tubes 123 and 125 to cut-off. Furthermore, voltages developed in the register circuits are applied as will be described later in more detail over lines 130—139 to bias the various delay gate tubes to cut-off and the zero gate tubes to conduction in the line selecting circuit of Fig. 8.

The negative pulses incoming over line 35 are applied to the first register circuit including tubes 123 and 124. When the register circuit is in its normal condition, that is with tube 124 conducting and tube 123 biased to cut-off, voltage is applied to line 130 maintaining the associated zero device of Fig. 8 in operation and over line 131 blocking a delay gate to be described in more detail later. The first incoming pulse on line 35 passes through resistance 121 to the grid of tube 124 thus causing this tube to cut-off rendering, however, tube 123 operative and applying control voltages to lines 130 and 131 which serve to block the first zero gate and open the first delay gate. The output from tube 124 is applied over a line 140 to the second register circuit comprising tubes 125 and 126 serving to transfer conduction from tube 126 to 125 and from 125 to 126 alternately each time the trigger circuit 123, 124 restores to normal condition (i. e. each time tube 124 becomes conductive). It will thus be clear that the second register shifts its condition for every second pulse applied to the first register while the first register changes its condition for every incoming pulse. The third register 127 is similarly controlled over line 141 so that the register circuit 127 changes its condition each time the second register circuit restores to normal (i. e. each time tube 126 becomes conductive) making register 127 shift its condition once for every two operations of the second register circuit. The fourth register 128 is similarly caused to shift its condition each time the third register 127 restores to normal and the fifth register 129 is similarly controlled from the output of the fourth register 128.

Turning now more specifically to Fig. 8, the operation of these various registers for controlling the delay will be more fully explained. In order to understand the operation of this system it first should be understood that the dials such as 76, Fig. 4, for each line are numbered with digits from 1 to 20 representing the twenty lines. Each dial for any particular line is set so that when a called line is dialed, a number of pulses corresponding to the difference between the calling line and the called line will be transmitted to the exchange. It thus becomes necessary to produce time displacements in the communication energy corresponding to the difference in timing between the scanning of the two lines in the cathode ray scanning circuit 39. The different signalling pulses operate through the pulse register circuit of Fig. 7 as described above, to select the desired time displacement in accordance with the line which is being called. To this end, each of the register circuits is provided with a zero gate 142, 143, 144, 145 and 146 associated with the first, second, third, fourth and fifth register circuits respectively. Likewise, associated with each of these respective registers are different delay gates 148 (5 microseconds for the twenty line system), 149 (10 microseconds), 150 (20 microseconds), 151 (40 microseconds) and 152 (80 microseconds). Each of these delay gates includes a delay line. In the output of each of these delay lines are delay gate tubes 153 and 154 being illustrated in the case of gates 148 and 149. It is understood that similar delay lines and gate tubes are provided for the other delay gate circuits. In the normal condition, before any pulse arrives, the system is biased so that the zero gates 142 to 146 are all operative so that no delay will be provided in any of the pulses 109 incoming over line 33 from the line finder circuit of Fig. 6. These pulses 109 therefore will be applied directly from line 33 through the zero gate circuits 142 to 146 inclusive, and from there over line 155 to the output gate tube 156. Assuming for the moment that tube 156 is not disabled, its plate delivers corresponding pulses 157 over line 36 to the control electrode of tube 39, Fig. 4, and thence back onto the calling line. The first time the first register operates, the control potential is transferred from line 130 to line 131 rendering tube 153 conductive and biasing tube 142 to cut-off. Thus, if one pulse only is dialed, a delay of five microseconds is produced so that the energy incoming over line 33 will pass through the first delay gate 148 and the remaining zero gates 143 to 146 inclusive. The second pulse transfers the control potential from line 131 back to 130 causing zero gate 142 again to become operative and blocking tube 153 in delay gate 148. At the same time, the second register operates transferring the potential from line 132 to line 133 blocking the second zero gate 143 and opening gate tube 154 in the second delay gate 149 introducing a ten microsecond delay between line 33 and line 155. Thus, the second pulse will produce zero delay in 142, ten microsecond delay in 149 and zero delays in 144 to 146. The third incoming pulse will not affect the second register circuit but will again operate the first register circuit introducing the five microsecond delay gate 148 as well as the ten microsecond delay gate 149 producing a fifteen microsecond delay in the incoming energy. The fourth pulse then will return both the first and second register to normal but will operate the third register 127 producing a twenty microsecond delay at delay gate 150. The fifth pulse will again insert the five microsecond delay gate 148 so that there will be five and twenty microsecond delays producing a total of twenty five microseconds. The next pulse will switch out the five microsecond delay line and switch in the ten microsecond delay line producing a total delay of thirty microseconds. The next pulse will switch in the five microsecond delay line while leaving the ten and twenty microsecond delay ineffective thus producing thirty five microsecond delay. The next successive pulse will then render delay lines 148, 149 and 150 ineffective but will bring into circuit the fourth delay gate 151 with its forty microsecond delay. The other pulses will then bring in, in similar sequence, the five, ten and twenty microsecond delay gates 148, 149 and 150 introducing in sequence five microsecond delays until delay gate 152 is operated whereupon the process will again be repeated in five microsecond steps. Thus, with the five delay gates it is possible to produce any desired delay condition in the twenty lines. It will be clear that if a different number of lines are provided, additional stages for the binary counting system and additional zero gates and delay gates similar to those outlined herein may be provided to secure the proper delay in interconnection for any number of lines.

After the desired number has been dialed, the signalling energy from the calling subscriber will be transmitted as described over the common equipment circuit and line 33 in the link circuit to the grid of tube 156. The output pulse 157 from tube 156 is then transferred over line 36 to the control electrode of tube 39 as illustrated. The voice modulations of pulses 157 incoming over line 36 will then produce variations in the electron stream of tube 39 each time the beam is aligned with the called line electrode and this variation in energy will be passed over the line to the corresponding low-pass filter 73 of the called subscriber to the receiver circuit 78. For the purpose of calling, a tone frequency may be transmitted to operate any suitable tone control apparatus at the called subscriber's line or the output of receiver 78 may be such that attention is directed to the phone directly by whistle or other call transmitted by the calling subscriber.

In the foregoing it has been assumed that tube 156 was conducting, for the purpose of simplicity of explanation. Actually this tube is normally biased to cut-off in order that the dialing pulses incoming over link circuit 23 do not affect other lines during the dialing. This cut-off bias of output gate tube 156 is controlled by the gate control circuit comprising tubes 158 and 159. Tube 158 is normally conducting maintaining the grid of tube 156 biased to cut-off. These tubes 158, 159 in turn are controlled by tube 119 as follows: As explained above tube 119 of Fig. 5 becomes cut-off at the beginning of a series of dial pulses. At such time it sends out an ineffective positive pulse through condenser 160 to the grid of tube 158. As soon as the dialing operation is complete, however, the tube 119 returns to conducting condition sending out a negative pulse. This negative pulse cuts off tube 158, which in turn renders tube 159, and also gate tube 156, conductive. This permits the message energy to be transferred over line 36 to the called subscriber's line.

In order to protect the called line from being seized by the line finders of other links when the called subscriber's receiver is removed from the hook, a portion of the delayed pulse 157 is tapped from line 36 over line 37 through isolating resistors 161 in Fig. 4 to a busy pulse shaper 162 from whence it is conducted to the grid of busy gate tube 163. This limits the maximum possible value of the positive line finder pulse 89 from tube 85 which will be applied, after the called subscriber raises his receiver, to a value which is insufficient to operate the line finder gate tube of a searching line finder.

When the call is completed and the calling subscriber hangs up, the register circuits of Fig. 7 and the output gate control 158 and 159 of Fig. 5 must be restored to normal. This is done with tubes 164, 165 and 166 of Fig. 7. When the line finder 23 locks in, tube 105, Fig. 6, is driven to cut-off lowering the potential on the grid of tube 164 over line 31. This causes the flip-flop circuit comprising tubes 164 and 165 to operate transferring the conduction to tube 165. A negative pulse is thus sent over line 167 and condenser 168 to tube 166 which is biased to cut-off and, therefore, has no effect. Now when the line finder releases due to the calling subscriber hanging up, tube 105, Fig. 6, again conducts raising the bias on tube 164 over line 31 causing the flip-flop circuit 164, 165 to return to normal. The return of this circuit to normal sends a positive pulse to tube 166 lowering the potential on common resistance 169, thus restoring all of the register circuits and output gate control tubes 158, 159 to normal. In order to avoid excessive interaction between various register circuits and output gate tubes, register 169 should be sufficiently low. Then to insure resetting, tube 164 should carry sufficiently high currents. This tube may comprise several tubes in parallel.

In order to explain the operation of the system, a call will be traced through the circuit from line 1 to line 5. When the calling subscriber on line 1 removes the receiver from the hook in his sub-set (not shown), negative potential is applied to the dynode electrode 49. When the beam of tube 39 next traverses contact 49, secondary emission from this contact will produce a pulse in the common anode 69. This pulse then traverses through inverter circuit 81, clipper amplifier 84, cathode follower 85, resistor 87 and line 27 to the line finder gate tube 88. Line finder gate tube 88 then produces output pulses 100 which serve to lock oscillator 90 into place with the calling line. Thereafter, the pulses 96 derived from this oscillator (and therefore also the reshaped pulses 98) are maintained in coincidence with input pulses 89. Because of this coincidence, only that set of pulses 89 corresponding to the time channel of the calling line now under consideration are passed as pulses 100 by the gate tube 88. All other pulses 89 corresponding to time channels of other calling or called lines are suppressed, thus selecting exclusively the pulses of the line under consideration. These selected pulses 100 then serve to operate gate control tube 107 rendering input gate 103 next conductive, at the correct instants. The output pulses 109 from this tube 108 also represent only the desired ones of all the pulses received from anode 69.

The calling subscriber now dials the number 5 which in this instance produces 4 successive reductions of the bias on dynode 49. The result is that the particular set of pulses arriving over line 71 as a result of the scanning of this dynode suffer four successive reductions in amplitude. These pulses are applied over line 71, plate circuit of inverter 81, clipper tube 82, cathode follower 83, line 28 to the control grid of input gate 108. Because of the action of clipper tube 82, the four reductions in amplitude of the set of pulses now appear as four complete breaks in this set of pulses. These incoming pulses with their four dialing breaks then are repeated through tube 108 to line 33 as pulses 109. The pulses 109 are transferred over integrating network 110 where the dialing breaks are changed to dialing signals. These dialing signals pass through amplifier 111, transformer 112, clipper 113 (where they become square waves 115). These pass through differentiating network 116, dial gate tube 117 and line 35 to the register circuit. Simultaneously, the dialing signals pass through the further integrating circuit 120 to trigger the delay gate mechanism comprising tubes 114 and 119 into abnormal condition (i. e. with 114 operative and 119 cut-off) and this mechanism increases the positive screen bias of dial gate tube 117 so that it will readily pass the pulses 115 derived from these dialing signals. The successive pulses 115 then control the first three registers so as to bring the third one to abnormal condition but to restore the first two back to normal. This inserts delay gate 150 into circuit producing a twenty microsecond delay equivalent to the time difference in a cycle of the beam sweep of distributor tube 39 between terminal 49 and output terminal 53 associated with line 5. Simultaneously, the increase in plate potential of tube 119 applies a positive pulse through condenser 160 to gate control 158 and 159; but this has no effect, leaving tube 158 conducting, thus maintaining output gate tube 156 blocked during the dialing interval. As soon as the dialing is completed, the positive potential is removed from the grid of tube 114 restoring delay gate mechanisms 114, 119 to its normal condition with tube 119 conducting. This reduces the screen bias of tube 117 preventing further signals from reaching the registers of Fig. 7. Simultaneously the decrease of plate potential of tube 119 sends a negative pulse through condenser 160 to gate control 158, 159, triggering this to its abnormal condition with tube 159 conducting. This unblocks output gate 156. The voice signal pulses 109 arriving over line 33 are applied to the output gate tube 156. This tube then delivers output pulses 157 over line 36 to control grid 35 of tube 39 causing the beam to be modulated in amplitude in accordance with the signals incoming over line 1 each time the beam is in contact with the electrode 53 corresponding to line 5. These pulses varying in amplitude in accordance with the voice signals are then transferred over the corresponding low-pass filter 79 to the receiver 78 of the called subscriber.

When the calling subscriber completes the call and hangs up his receiver, the calling loop circuit is opened and the negative potential removed from electrode 49. When the beam then sweeps past 49 no output pulses will be applied over line 71 and connections to the line finder circuit will be broken. At the same time, the connection to the line finder circuit is broken, the output from the delay gain tube 105 terminates, and the control of lock-in oscillator 90 terminates so that the line finder is again free to pick up any new incoming call. At the same time, the potential from tube 105 is applied over line 31 to the release tube circuit 164, 165. Release tubes 164 and 165 restore to normal with 164 conducting. This produces a positive pulse which is transmitted through condenser 168 to tube 166. This applies a restoring potential to the common resistor 169 restoring all the register circuits to normal so that only the zero delay gates 142 to 159 are again operative. Similarly, gate control 158, 159 is restored to normal with tube 158 conducting. Thus, the whole link circuit is restored to normal.

In order that the pulses from any one incoming line may be effectively reduced in amplitude so as to prevent other line finders from thereafter seizing the same calling line 1, the delayed gain tube 105 and associated circuit are provided. It will be clear from the above description that when two or more subscribers are using the exchange at the same time there will be a plurality of differently timed pulses in the line circuits of the common equipment of Fig. 4. These pulses from the output of cathode follower 83 are applied to all of the link circuits in parallel. When one link circuit, however, has taken hold it is necessary that the pulses of this selected circuit be made ineffective to seize other links. A better understanding of the operation of the system to prevent this operation may be had by reference to Figs. 4 and 5 and the curves illustrated in Fig. 10.

The pulses from the anode 69 of tube 39 are applied to the grid of tube 81 which has separate plate and cathode outputs. The pulses from the plate output of tube 81 varying in amplitude in accordance with an incoming signal are shown in curve 10A. These pulses are clipped in clipper 82 at the level 170 so that only the modulated or varying amplitude portions 171 of the pulses are passed out through the plate circuit of this tube to cathode follower 83. Preferably, the energy is only about 25% modulated so that the modulation variations will constitute the minor portion of the pulsing energy. These pulses are used for transmitting speech and are not of interest in connection with the feature now being considered.

The pulses from the cathode output of tube 81 are the ones of primary interest. These pulses are clipped in tube 84 and passed through cathode follower 85 so as to produce a series of equal amplitude pulses 86 as shown in curve 10B. These pulses 86 are applied through resistors 87 as pulses 89 to the grids of all line finder gate tubes 88 in Fig. 6. Lock-in oscillator 90 produces an output wave 172, curve 10C, whose period is slightly longer than the time interval between two pulses 89. Wave 172 is clipped at clipping levels 173 and 174 then differentiated and again clipped to produce pulses whose leading edges substantially coincide with the instant of rise of wave 172 between the clipping levels. These pulses which are preferably substantially wider than the incoming pulses 89, pass through cathode follower 97 and the resulting pulses 98 are applied to the gate tube 88. Since the frequencies are slightly different, the phase or time position of pulses 89 will continually shift with respect to pulses 98 until pulse 89 coincides with pulse 98 as shown in curve 10D. When this occurs, the line finder gate 88, Fig. 6, is operated so that the pulses may pass through peaked amplifier 102 to the oscillator 90 locking it into step with the pulses. The phase correction of peaked amplifier 102 is so adjusted that sine wave 172 will rise through zero slightly before the time of arrival of pulse 89. The pulses 98 will then be produced in fixed time relationship with pulses 89 as shown in first waveform of curve 10E. Once these pulses are synchronized, the delay gain tube 105 cuts off increasing the screen bias of tube 95 so that the selecting pulses 98 increase from their normal "search" amplitude to a much higher "holding" amplitude as shown in the second wave form in curve 10E, thus reducing the effective height of pulses 89. Thus, pulses 89 applied to the grids of line finder gate tubes (corresponding to tube 88) in all other line finders will be very small as shown in the third waveform of curve 10E. Then even if coincidence between these pulses 89 and the normal or "search" selecting pulse 98 of such other line finders does occur, no signal will be passed through the gate tubes of such other line finders as shown in the fourth waveform of curve 10E.

When the called party answers, the closure of his line loop 5 places on the dynode 53 a potential similar to that of a calling line. If no special precautions were taken this would cause another line finder to seize the called party's line thus tying up an additional link. To avoid this, the busy shaper 162, and busy gate 163 are provided which function as follows:

After the completion of dialing the output gate, tube 156 commences to pass the speech pulses 157 over line 36 to control grid 35 of distributor tube 39 as previously described. Part of the energy of these pulses 157 is branched from line 36 in Fig. 8 and passes over line 37 and isolating resistor 161 to the busy gate shaper 162, which amplifies, clips and reshapes these pulses into strong, sharp constant amplitude pulses. (For this purpose the clipping level of speech clipper tube 82 should be set so that the speech modulation never reduces pulses 171 below a small fixed minimum value.) The reshaped pulses from 162 are applied to the grid of busy gate tube 163 to make this momentarily highly conductive. This gate tube 163 then imposes a fixed upper limit upon the amplitude of the positive pulses 89, so that these cannot attain an amplitude sufficient to cause seizure of the called line by another line finder. Preferably, however, this upper limit is high enough to hold a line finder which has already locked itself to the called line (in order that the act of selecting a line already engaged as calling line in a previous connection shall not break down such previous connection).

Turning to Fig. 11, there is illustrated a delay line in the system where the longer delays are required. For the shorter intervals shown in delay gates 148, 149 and 150 of five, ten and twenty microseconds, artificial delay lines of known form may readily be used. However, for the longer delays, acoustic delay means may be preferable. The line may, for example, comprise a container 175 filled with mercury 176, having a length $$l=\frac{V}{D}$$

where V is the velocity of sound in the liquid and D is the desired delay time. At the input end is provided a crystal, for example a quartz crystal 177, in a suitable mounting ring 178 with an electrode 179 coupled with line 180 for the input signal.

It will be evident from the foregoing description that we have provided protective means to insure maintenance of a connection between called and calling party while preventing selection of other line finders by either of the lines involved. Moreover, it will be clear that the variation in sensitivity produced in response to synchronization of the selecting oscillator may have other applications than in the particular environment chosen for illustration. Moreover, the busy gate signalling may be applicable to other circuits than that shown herein.

It is to be distinctly understood that the specific example and application used for illustration is given merely by way of example and not as any limitation on our invention as set forth in the objects thereof and in the accompanying claims.

We claim:

1. In a telephone exchange system, means for allotting to each of a plurality of normally inactive telephone channels a predetermined time interval whereby the channels are each represented by a series of pulses of a predetermined repetition rate, a plurality of link circuits each comprising means for selecting a calling channel and establishing a circuit therefrom to a predetermined called channel, means for producing calling signals at said repetition rate when a channel is taken into use, means responsive to said calling signals on the calling channel for blocking others of said link circuits from selecting said calling channel, and means responsive to establishment of said circuit for blocking all said link circuits from selecting said called channel when said called channel is taken into use.

2. A channel finder circuit for selecting a signal channel from a plurality of channels having signal carrying pulses of a given repetition rate, said channels having different time displacements, comprising selecting means normally testing said channels in sequence for the presence of signal carrying pulses, means responsive to coincidence of testing by said selecting means and the presence of signal carrying pulses of any one channel for halting the progression of said selecting means whereby said one channel will be continuously selected, and means responsive to selection of said one channel for reducing the effectiveness of said selected channel pulses for other channel finder circuits.

3. A channel finder circuit for selecting a signal channel from a plurality of channels having signal carrying pulses of a given repetition rate, said channel having different time displacements comprising an oscillator means normally operating at a frequency lower than said repetition rate for testing said channels in sequence for the presence of signal carrying pulses, means responsive to coincidence of testing by said oscillator means and the presence of signal carrying pulses of any one channel for synchronizing said oscillator means with the repetition rate of said pulses whereby said one channel will be continuously selected, and means responsive to selection of said one channel for blocking selection of other channels by the channel finder circuit.

4. A circuit according to claim 3, further comprising means operative in response to said selection for reducing the effective sensitivity of the other channel finder circuits for said selected channel.

5. In a telephone exchange system, means for allotting to each of a plurality of telephone channels a predetermined time interval to represent each channel by a series of pulses of a predetermined repetition rate, a plurality of link circuits each comprising a normally ineffective multi-electrode discharge tube for selecting a calling channel to the exclusion of other channels, means responsive to the pulse of said selected channel for establishing a circuit from said calling channel to a called channel, means responsive to calling signals on said selected calling channel for blocking the tubes of others of said link circuits from becoming effective and selecting said calling channel, and means responsive to establishment of said circuit for blocking the tubes of all said link circuits from selecting said called channel.

6. In a telephone exchange system, means for allotting to each of a plurality of telephone channels a predetermined time interval whereby the channels are each represented by a series of pulses of a predetermined repetition rate, a plurality of link circuits each comprising means including a normally ineffective multi-electrode discharge tube for selecting a calling channel and establishing a circuit from said calling channel to a called channel, and means responsive to the pulses on the channel for rendering effective the tube of one link circuit and blocking the tubes of the other link circuits.

7. The telephone exchange system according to claim 6, and means responsive to establishment of said circuit for blocking all said tubes from selecting said called channel.

8. In a telephone exchange system, means for allotting to each telephone channel a predetermined time interval to represent each channel by a series of pulses of predetermined repetition rate, means responsive to a calling channel for producing calling pulse signals, a plurality of link circuits each comprising means for producing unblocking pedestal pulses at a frequency slightly different from said predetermined repetition rate, mixer circuit means for mixing said calling pulses and said pedestal pulses, whereby when the pedestal pulses and the calling pulses coincide pulses will be passed by said circuit, means responsive to said passed pulses for synchronizing the pedestal pulses with said repetition rate whereby said calling channel will be continuously selected, and means responsive to said continuous selection for increasing the amplitude of said pedestal pulses whereby sensitivity of said link will be preserved.

9. In a telephone exchange system, distributor means for allotting to each telephone channel a predetermined time interval whereby the channels are each represented by a series of pulses of predetermined repetition rate, means responsive to a calling channel for producing calling pulse signals, a plurality of link circuits each comprising means for producing unblocking pedestal pulses at a frequency slightly different from said predetermined repetition rate, a biased mixer circuit means for mixing said calling pulses and said pedestal pulses, whereby when the pedestal pulses and the calling pulses coincide pulses will be passed by said circuits, means responsive to said passed pulses for synchronizing the pedestal pulses with said repetition rate whereby said calling channel will be continuously selected, means responsive to said continuous selection for increasing the amplitude of said pedestal pulses whereby sensitivity of said link will be preserved, and means for applying a negative pulse to the mixers of other link circuits whereby said other link circuits will be blocked from selecting said channel.

10. In a telephone exchange system, distributor means for allotting to each telephone channel a predetermined time interval whereby the channels are each represented by a series of pulses of predetermined repetition rate, means responsive to a calling channel for producing calling pulse signals, a plurality of link circuits each comprising means for producing unblocking pedestal pulses at a frequency slightly different from said predetermined repetition rate, a mixer circuit, means for mixing said calling pulses and said pedestal pulses, whereby when the pedestal pulses and the calling pulses coincide pulses will be passed by said circuit, means responsive to said passed pulses for synchronizing the pedestal pulses with said repetition rate whereby said calling channel will be continuously selected, means responsive to said continuous selection for increasing the amplitude of said pedestal pulses whereby sensitivity of said link will be preserved, means for applying a negative pulse to the mixers of other link circuits whereby said other link circuits will be blocked from selecting said channel, means responsive to signals over said selected channel for establishing a communication circuit to a predetermined called channel, and means responsive to establishment of said connection for applying blocking pulses corresponding in time and repetition rate with said selected called channel to said link circuits to prevent selection of the called party's line during communication selection.

11. In a telephone exchange system, distributor means for allotting to each telephone channel a predetermined time interval to represent each channel by a series of pulses, means responsive to a calling channel for producing calling pulse signals, a plurality of link circuits each comprising a selecting oscillator operating at a frequency slightly lower than the repetition frequency of the pulses of each channel, means for producing unblocking pedestal pulses at the frequency of said oscillator, a selector mixer, means for applying said calling pulses and said pedestal pulses to said mixer, whereby when the pedestal pulses and the calling pulses coincide pulses will be passed by said circuit, means responsive to said passed pulses for synchronizing said oscillator with said repetition rate whereby said calling channel will be continuously selected, means responsive to said continuous selection for increasing the amplitude of said pedestal pulses whereby sensitivity of said link will be preserved, means for applying a negative pulse to the selector mixers of other link circuits whereby said other link circuits will be blocked from selecting said channel, means responsive to signals over said selected channel for establishing a communication circuit to a called channel, and means responsive to establishment of said connection for applying blocking pulses corresponding in time and repetition rate with said selected called channel to said link circuits to prevent selection of the called party's line during communication selection.

12. In a telephone exchange system, distributor means for allotting to each telephone channel a predetermined time interval whereby the channels are each represented by a series of pulses, means responsive to a calling channel for producing calling pulse signals, a plurality of link circuits each comprising a selecting oscillator operating at a frequency slightly lower than the repetition frequency of the pulses of each channel, means for producing unblocking pedestal pulses at the frequency of said oscillator, an electron discharge tube mixer, means for applying said calling pulses and said pedestal pulses to said mixer to produce a composite control, whereby when the pedestal pulses and the calling pulses coincide pulses will be passed by said circuit, means responsive to said passed pulses for synchronizing said oscillator with said repetition rate whereby said calling channel will be continuously selected, and means responsive to said continuous selection for increasing the amplitude of said pedestal pulses whereby sensitivity of said link will be preserved.

13. In a telephone exchange system, distributor means for allotting to each telephone channel a predetermined time interval whereby the channels are each represented by a series of pulses, means responsive to a calling channel for producing calling pulse signals, a plurality of link circuits for selecting a predetermined incoming calling channel, means responsive to signals over said selected channel for establishing a communication circuit to a predetermined called channel, and means responsive to establishment of said connection for applying blocking pulses corresponding in time and repetition rate with said selected called channel to said link circuits to prevent selection of the called party's channel during communication selection.

14. In a telephone exchange system, distributor means for allotting to each telephone channel a predetermined time interval whereby the channels are each represented by a series of pulses, means responsive to a calling channel for producing calling pulse signals, a plurality of link circuits each comprising a selecting oscillator operating at a frequency slightly lower than the repetition frequency of the pulses of each channel, means for producing unblocking pulses at the frequency of said oscillator, a selector mixer, means for applying said calling pulses and said unblocking pulses to said mixer to progressively test said channels, whereby pulses will be passed upon coincidence of said applied pulses, means responsive to said passed pulses for synchronizing said oscillator with said repetition rate whereby said calling channel will be continuously selected, means responsive to said continuous selection for increasing the amplitude of said pedestal pulses whereby sensitivity of said link will be preserved, means for applying a blocking pulse to the mixers of other link circuits whereby said other link circuits will be blocked from selecting said channel, means responsive to calling signals over said selected channel for establishing a communication circuit to a predetermined called channel, and means responsive to establishment of said connection for applying other negative blocking pulses corresponding in time and repetition rate with said selected called channel to said link circuits to prevent selection of the called party's line during communication selection.

15. In a telephone exchange system, means including a continuously rotating distributor for successively allotting to each of a plurality of telephone stations channels during a predetermined time interval, means for producing for each channel a series of pulses of a predetermined repetition rate, a plurality of link circuits each comprising means including a normally ineffective multi-electrode discharge tube for selecting a channel allotted to a calling station and establishing a circuit through said distributor from said calling station over its channel to a called station over its channel, and means responsive to the pulses on the calling station's channel for rendering effective the tube of one link circuit and blocking the tubes of the other link circuits only when said distributor allots the calling station.

16. The telephone system according to claim 15, and in which the distributor is a cathode ray tube having electrodes in which terminate lines leading to said stations.

17. The telephone system according to claim 15, and means for blocking the tubes of all link circuits when the distributor allots the called channel.

18. A channel finder circuit for selecting a signal channel from a plurality of channels having signal carrying pulses of a given repetition rate, said channels having different time displacements, comprising selecting means normally testing said channels in sequence, a normally ineffective multi-electrode discharge tube made effective by pulses resulting from coincidence of testing by said selecting means and signal carrying pulses of one channel, means operative thereupon for selecting said one channel, and a multi-electrode discharge tube responsive to selection of said one channel for reducing the effectiveness of the resulting pulses for the tubes of other channel finder circuits.

19. The circuit according to claim 18, and in which the first mentioned tube has two input circuits to one of which pulses representing the calling channel are fed.

20. The circuit according to claim 19, means for supplying pulses to the second input circuits at a certain rate different from the repetition rate, and an output circuit for the first-mentioned tube controlling the last-mentioned means.

EDMOND M. DELORAINE.
DAVID H. RANSOM.

REFERENCES CITED

The following references are of record in the file of this patent:

UNITED STATES PATENTS

| Number | Name | Date |
|---|---|---|
| 2,387,018 | Hartley | Oct. 16, 1945 |
| 2,406,165 | Schroeder | Aug. 20, 1946 |
| 2,418,116 | Grieg | Apr. 1, 1947 |